Figures 1, 2:
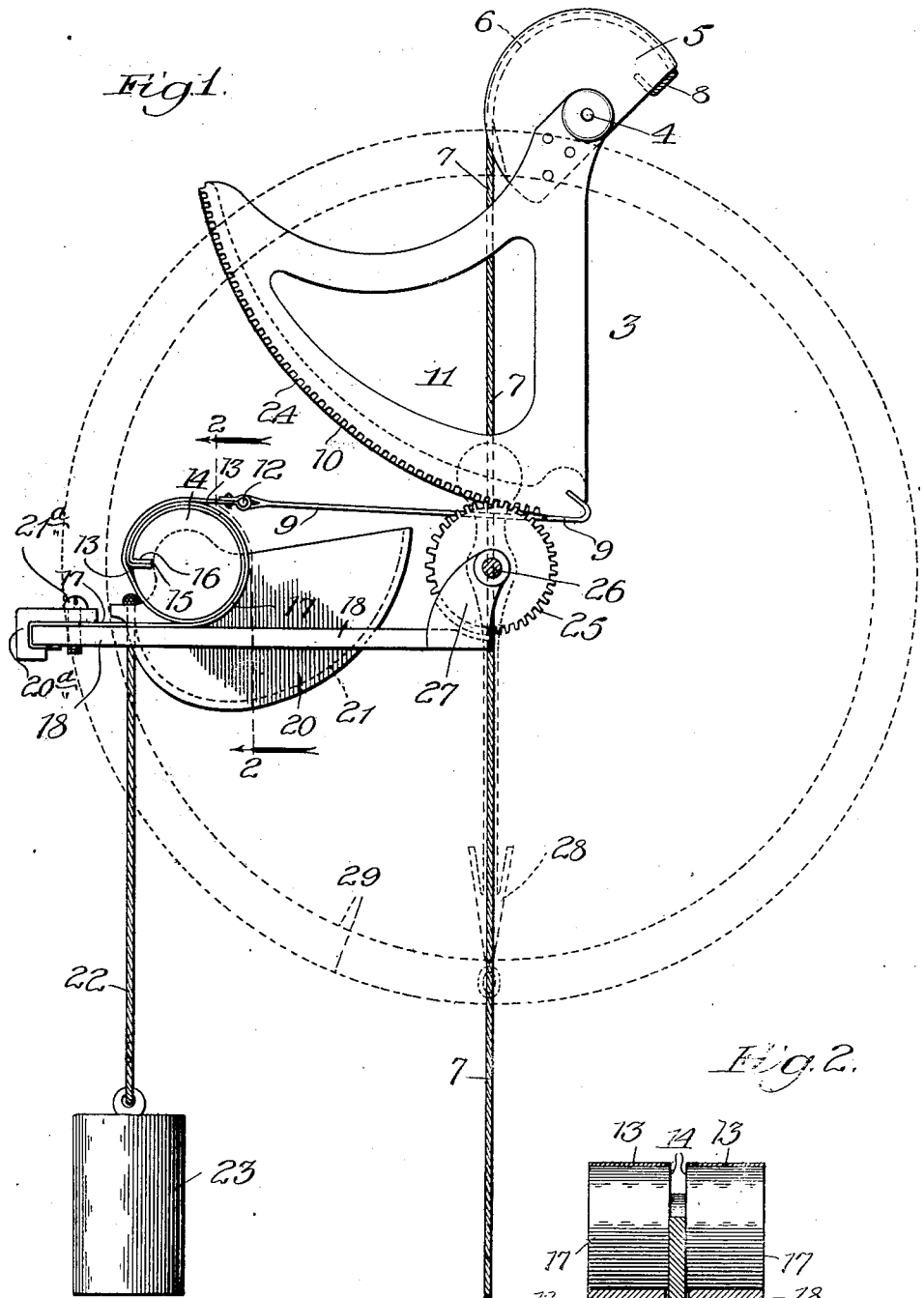

M. B. MILLS.
WEIGHING MECHANISM.
APPLICATION FILED APR. 16, 1919.

1,371,640.

Patented Mar. 15, 1921.

Witnesses:

Inventor:
Mortimer B. Mills,

UNITED STATES PATENT OFFICE.

MORTIMER B. MILLS, OF CHICAGO, ILLINOIS.

WEIGHING MECHANISM.

1,371,640.  Specification of Letters Patent.  Patented Mar. 15, 1921.

Application filed April 16, 1919. Serial No. 290,447.

*To all whom it may concern:*

Be it known that I, MORTIMER B. MILLS, a citizen of the United States, residing at Chicago, in the county of Cook and State of Illinois, have invented a new and useful Improvement in Weighing Mechanism, of which the following is a specification.

My primary object is to provide a novel, simple, and positively operating scale mechanism which will present the minimum friction of the operating parts and operate to indicate accurately the weight of an object placed on the scale.

Referring to the accompanying drawing—Figure 1 is a view in front elevation of a scale mechanism constructed in accordance with my invention, the supporting structure for the parts being omitted, and likewise the scale dial; and Fig. 2, a section taken at the irregular line 2—2 on Fig. 1 and viewed in the direction of the arrows.

3 represents an arm pivotally supported as indicated at 4 either on a standard (not shown) of the scale where the scale is of the platform type, or from a suspension member where the scale is of the suspension type, this arm being rigidly connected with a head 5 presenting a groove 6 extending concentric with the axis of the pivot 4, this groove extending, in the particular arrangement shown, substantially throughout 180°. The cable represented at 7 is rigidly connected as indicated at 8 with the head 5 and at its opposite end, in practice, connects with the weighing platform of a platform scale or a scale pan of a suspension scale, whereby the weight of the object to be weighed is exerted against the weighing mechanism through the cable 7, which latter lies at its upper portion within the groove 6. The member 3 is connected at its lower end with a non-stretchable strip 9, which extends against the lower curved surface 10 of an extension 11 carried by the arm 3, the curved surface 10 being concentric with the axis of the pivot 4. At its opposite end, the member 9 connects as through the medium of a cross-bar 12 with flexible members in the form of parallel bands 13 of a material which is relatively non-stretchable under the stress to which they are subjected in the operation of the mechanism; and while any suitable material may be employed, it is preferred that these bands be made of shim steel, which is relatively non-stretchable and which may be provided of a thickness of about three one-thousandths of an inch. The bands 13 are wound in parallel relation about the peripheries of the roller-shaped ends of a rotatable member 14, the ends of these bands 13 opposite the points at which they connect with the member 9 being secured to the member 14 as represented of one of the roller-ends at 15, preferably by securing these ends of the bands in grooves 16 in the peripheries of the end-portions of the member 14. The member 14 is also connected with another pair of non-stretchable bands represented at 17, these bands being wound upon the periphery of the member 14 with the bands 13 interposed therebetween as indicated in Fig. 1, the bands 17 being connected with the member 14 at the slotted portions 16 thereof as explained of the bands 13 and as shown in Fig. 1, the idea being to rigidly secure to the member 14 the ends of the bands 13 and 17 shown as extending into the grooves 16. The other ends of the bands 17 are secured to one end of a plate 18 slotted as indicated at 19 and supported from the standard or suspension member hereinbefore referred to, as the case may be, the connection of the bands 17 with the plate 18 being, in accordance with the illustration, through the medium of a clip 20ª which fits over the end of the plate 18 and is held in place thereon with the bands 17 interposed therebetween by means of screws 21ª, one only of which is shown.

The member 14 which extends at its roller ends directly above the portions of the plate 18 at the opposite sides of its slot 19, is provided intermediate its roller ends with a fin 20 in the form of a plate which extends through the slotted portion 19 of the plate as represented, the peripheral surface of this plate being of general involute form relative to the axis of the member 14, this peripheral surface being curved lengthwise as indicated at 21. A flexible member, such as a cable 22 connects at one end with the member 20 to extend against its peripheral portion, this connection being at a point adjacent that portion of this surface which is nearest the axis of the member 14, the cable 22 carrying a weight 23 and in the rotation of the member 14 to the right in Fig. 1 along the plate 18, in the swinging of the arm 3 to the right in this figure, winding upon the general involute peripheral surface of the member 20. The peripheral surface referred to of the member 20 is of such shape as shown, that as the member 14 rolls to the right in Fig. 1, the engagement of the cable 22 with this peripheral surface will be progressively farther from the center of the axis of the member 14, and regardless of the position to which the member 14 rotates, the lowermost point at which the member 22 contacts the peripheral surface of the member 20 remains in the same vertical plane, consequently, there is no lateral shifting of the depending portion of the member 22 and the weight 23. Furthermore, and this is a matter of importance, the provision of the member 20 as stated operates to cause the rotation of the arm 3 about its axis 4 to be directly proportional to the amount of weight applied to the scale and exerted downwardly against the member 7 and thus it is possible to use a uniformly graduated scale for indicating the weight of the object applied thereto. In the particular arrangement shown, the arm extension 11 is provided, adjacent the curved surface 10, but forwardly offset therefrom, with a segmental rack which meshes with a gear 25 rotatably mounted in any suitable way, as through the medium of a shaft 26 journaled in spaced bearings, one only of which is shown at 27, this gear being rigidly connected, through the medium of the shaft 26, with a pointer 28 secured on the forward end of this shaft and coöperating with a scale indicated by the dotted lines 29, this scale in practice being provided about its periphery with uniformly spaced graduations representing pounds and fractions thereof, in accordance with common practice.

The cable 22 will be so weighted as with the weight 23, as to balance the weight of the parts which would tend to rotate the shaft 26 in anti-clockwise direction in Fig. 1, for causing the pointer 28 to extend opposite the zero graduation of the scale, which in the particular arrangement shown would be at the lowermost portion of the scale.

When the weight is applied to the mechanism through the medium of the cable 7, the arm 3 is swung to the right in Fig. 1, causing the curved surface 10 of the arm extension 11 to roll against the member 9 which thus winds upon it, and unwinds the bands 13 from the member 14 and the member 14 from the bands 17, the member 14 rolling along the plate 18 to the right in Fig. 1, with the bands 17 interposed therebetween, the general involute peripheral surface of the fin 20 rolling against the weighted cable 22, the rack 24 in this movement moving across the periphery of the gear 25 thereby rotating it in clockwise direction in Fig. 1, and swinging the pointer 28 in the same direction across the scale dial 29 and indicating on the dial the weight of the object being weighed.

While I have illustrated and described a particular construction embodying my invention, I do not wish to be understood as intending to limit it thereto as the same may be variously modified and altered without departing from the spirit of my invention, it being my intention to claim my invention as fully and completely as the prior state of the art will permit.

What I claim as new and desire to secure by Letters Patent, is:—

1. In a weighing scale, the combination with mechanism comprising, in combination, a bodily-movable rotatable member of roller form and having a part presenting a surface of general involute form, a substantially horizontal support upon which said member is rollingly supported, means tending to rotate said member in one direction along said support and including a flexible element connected with said member and engaging said surface, and means engaging said member for actuating the latter along said support against the action of said first-named means by the application of weight to the scale and in such movement winding said flexible element upon said surface, of a weight-indicating device involving a pivotally-supported element operatively controlled by said mechanism, the pivot of said pivotally-supported element being fixed.

2. In a weighing scale, the combination with mechanism comprising, in combination, a bodily-movable rotatable member of roller form and provided with a radially-disposed extension between its ends presenting a surface of general involute form, a slotted support upon which said member is rollingly supported at its ends, said extension projecting into the slotted portion of said support, means tending to rotate said member in one direction along said support including a flexible element connected with said member and engaging said surface, and means engaging said member for actuating the latter against the action of said first-named means by the application of weight to the scale and in such movement winding said flexible element upon said surface, of a weight-indicating device involving a pivotally-supported element operatively controlled by said mechanism, the pivot of said pivotally-supported element being fixed.

3. In weighing mechanism, the combination of a rotatable member presenting a surface of general involute form, means tending to rotate said member in one direction and including a flexible element connected with said member and engaging said surface, and means engaging said member for actuating the latter against the action of said first-named means by the application of weight to the mechanism and in such movement winding said flexible element upon said surface, said last-named means including a band device connected with said member and engaging its periphery and operating to rotate said member when drawn upon, and a rock member operated by the application of weight to the mechanism and having a curved surface, said band device engaging said curved surface in the operation of said rock member for operating said first-named member.

4. In a weighing scale, the combination with mechanism comprising, in combination, a rotatable member presenting a surface of general involute form, means tending to rotate said member in one direction and including a flexible element connected with said member and engaging said surface, and means engaging said member for actuating the latter against the action of said first-named means by the application of weight to the scale and in such movement winding said flexible element upon said surface, said last-named means including a band device connected with said member and engaging its periphery and operating to rotate said member when drawn upon, and a rock member operated by the application of weight to the scale and having a curved surface, said band device engaging said curved surface in the operation of said rock-member for operating said first-named member, of a weight-indicating device involving a pivotally-supported element operatively controlled by said mechanism, the pivot of said pivotally-supported element being fixed and non-coincident with the axis of said member.

5. In weighing mechanism, the combination of a rotatable member presenting a surface of general involute form, means tending to rotate said member in one direction and including a flexible element connected with said member and engaging said surface, means engaging said member for actuating the latter against the action of said first-named means by the application of weight to the mechanism and in such movement winding said flexible element upon said surface, said last-named means including a band device connected with said member and engaging its periphery and operating to rotate said member when drawn upon, and a rock member operated by the application of weight to the mechanism and having a curved surface, said band device engaging said curved surface in the operation of said rock member for operating said first-named member, and a weight-indicating device involving a pivotally-supported element actuated by said last-named means, the pivot of said last-named element being fixed and non-coincident with the axis of said member.

6. In weighing mechanism, the combination of a rotatable member presenting a surface of general involute form, means tending to rotate said member in one direction and including a flexible element connected with said member and engaging said surface, and means engaging said member for actuating the latter against the action of said first-named means by the application of weight to the mechanism and in such movement winding said flexible element upon said surface, said last-named means including a band device connected with said member and engaging its periphery and operating to rotate said member when drawn upon, a rock member operated by the application of weight to the mechanism and having a curved surface, the said band device engaging said curved surface in the operation of said rock member and actuating said first-named member, and a weight-indicating device operatively engaging, and operated by, said rock member.

7. In weighing mechanism, the combination of a rotatable member presenting a surface of general involute form, means tending to rotate said member in one direction and including a flexible element connected with said member and engaging said surface, and means engaging said member for actuating the latter against the action of said first-named means by the application of weight to the mechanism and in such movement winding said flexible element upon said surface, said last-named means including a band device connected with said member and engaging its periphery and operating to rotate said member when drawn upon, a rock member operated by the application of weight to the mechanism and having a curved surface, the said band device engaging said curved surface in the operation of said rock member and actuating said first-named member, said rock member having a segmental rack, and a weight-indicating device including a rotatably supported member equipped with a gear meshing with said rack.

8. In weighing mechanism, the combination of a bodily movable rotatable member of roller form and presenting a surface of general involute form, a support upon which said member is rollingly supported, means tending to rotate said member in one direction along said support, and including a flexible element connected with said member and engaging said surface, and means engaging said member for actuating the latter along said support against the action of said first-named means by the application of weight to the mechanism and in such movement winding said flexible element upon said surface, said last-named means including a band device connected with said member and engaging its periphery and operating to rotate said member when drawn upon, and a rock member operated by the application of weight to the mechanism and having a curved surface, said band device engaging said curved surface in the operation of said rock member and actuating said first-named member.

9. In a weighing scale, the combination with mechanism comprising in combination, a bodily movable rotatable member of roller form and presenting a surface of general involute form, a support upon which said member is rollingly supported, means tending to rotate said member in one direction along said support, and including a flexible element connected with said member and engaging said surface, and means engaging said member for actuating the latter along said support against the action of said first-named means by the application of weight to the scale and in such movement winding said flexible element upon said surface, said last-named means including a band device connected with said member and engaging its periphery and operating to rotate said member when drawn upon, and a rock-member operated by the application of weight to the scale and having a curved surface, said band device engaging said curved surface in the operation of said rock member and actuating said first-named member, of a weight-indicating device involving a pivotally-supported element operatively controlled by said mechanism, the pivot of said pivotally-supported element being fixed and non-coincident with the axis of said member.

10. In weighing mechanism, the combination of a rotatable member, means engaging the periphery of said member and tending to rotate it in one direction and including a flexible element connected with said member and engaging its periphery, and means engaging said member for actuating the latter against the action of said first-named means by the application of weight to the mechanism and in such movement winding said flexible element upon the periphery of said member, the peripheral surface of said member engaged by said flexible element being of such shape that the travel of said second-named means under the action of weight applied to the mechanism will be directly proportional to the weight applied to the mechanism.

11. In a weighing scale, the combination with mechanism comprising in combination, a bodily-movable rotatable member having a part presenting a surface of general involute form, a substantially horizontal support upon which said member is rollingly supported, means tending to rotate said member in one direction along said support and including a flexible element connected with said member and engaging said surface, and means engaging said member for actuating the latter against the action of said first-named means by the application of weight to the scale and in such movement winding said flexible element upon said surface, and a weight-indicating device involving a pivotally - supported element operatively controlled by said mechanism, the pivot of said pivotally-supported element being fixed.

12. In weighing mechanism, the combination of a bodily-movable rotatable member having a part presenting a surface of general involute form, a substantially horizontal support upon which said member is rollingly supported, means tending to rotate said member in one direction and including a flexible element connected with said member and engaging said surface, means engaging said member for actuating the latter against the action of said first-named means by the application of weight to the mechanism and in such movement winding said flexible element upon said surface, and a weight-indicating device involving a pivotally-supported element actuated by said last-named means, the pivot of said last-named element being fixed.

13. In a weighing-scale, the combination of a bodily-movable rotatable member having a part of roller formation and a part presenting a surface of general involute form, a substantially horizontal support upon which said member is rollingly supported, means tending to rotate said member in one direction along said support and including a flexible element connected with said member and engaging said surface, means engaging said member for actuating the latter along said support against the action of said first-named means by the application of weight to the mechanism and in such movement winding said flexible element upon said surface, and a weight-indicating device involving a pivotally-supported element actuated by said last-named means, the pivot of said last-named element being fixed.

14. In a weighing-scale, the combination with mechanism comprising, in combination, a bodily-movable rotatable member having a part presenting a surface of general involute form, a substantially horizontal support upon which said member is rollingly supported, means tending to rotate said member in one direction along said support and including a flexible element connected with said member and engaging said surface, and band means connected with said member and engaging its periphery and operating to rotate said member along said support against the action of said first-named means by the application of weight to the scale and in such movement winding said flexible element upon said surface, of a weight-indicating device involving a pivotally-supported element operatively controlled by said mechanism, the pivot of said pivotally-supported element being fixed.

15. In a weighing-scale, the combination with mechanism comprising, in combination, a bodily-movable rotatable member of roller form and having a part presenting a surface of general involute form, a substantially horizontal support upon which said member is rollingly supported, means tending to rotate said member in one direction along said support and including a flexible element connected with said member and engaging said surface, and band means connected with said member and engaging its periphery and operating to rotate said member along said support against the action of said first-named means by the application of weight to the scale and in such movement winding said flexible element upon said surface, of a weight-indicating device involving a pivotally-supported element operatively controlled by said mechanism, the pivot of said pivotally-supported element being fixed.

16. In a weighing-scale, the combination with mechanism comprising, in combination, a bodily-movable rotatable member of roller form and having a part presenting a surface of general involute form, a substantially horizontal support upon which said member is rollingly supported, means tending to rotate said member in one direction along said support and including a flexible element connected with said member and engaging said surface, band means stationarily secured at one end and engaging the periphery of, and secured at its opposite end to, said member, and other band means connected with said member engaging its periphery and operating to rotate said member along said support against the action of said first-named means by the application of weight to the scale and in such movement winding said flexible element upon said surface, of a weight-indicating device involving a pivotally-supported element operatively controlled by said mechanism, the pivot of said pivotally-supported element being fixed.

17. In a weighing-scale, the combination with mechanism comprising, in combination, a rotatable member, a substantially horizontal support upon which said rotatable member is rollingly supported, means engaging the periphery of said member and tending to rotate it in one direction and including a flexible element connected with said member and engaging its periphery, and means engaging said member for actuating the latter against the action of said first-named means by the application of weight to the scale and in such movement winding said flexible element upon the periphery of said member, the peripheral surface of said member engaged by said flexible element being of such shape that the travel of said second-named means under the action of weight applied to the scale will be directly proportional to the weight applied to the scale, of a weight-indicating device involving a pivotally-supported element, the pivot of said element being fixed and non-coincident with the axis of said member.

18. In weighing mechanism, the combination of a rotatable member, a substantially horizontal support upon which said member is rollingly supported, means engaging the periphery of said member and tending to rotate it in one direction along said support and including a flexible element connected with said member and engaging its periphery, means engaging said member for actuating the latter against the action of said first-named means by the application of weight to the mechanism and in such movement winding said flexible element upon the periphery of said member, the peripheral surface of said member engaged by said flexible element being of such shape that the travel of said second-named means under the action of weight applied to the mechanism will be directly proportional to the eight applied to the mechanism, and a weight-indicating device involving a pivotally-supported element actuated by said last-named means, the pivot of said last-named element being fixed and non-coincident with the axis of said member.

19. In weighing mechanism, the combination of a bodily-movable rotatable member presenting a portion of circular-shape and a surface of general involute form, a substantially horizontal support upon which said member is rollingly supported, means tending to rotate said member in one direction along said support and including a flexible element connected with said member and engaging said surface, and flexible means engaging the circular portion of said member and actuated by the application of weight to the mechanism and in such movement winding said flexible element upon said surface.

20. In a weighing scale, the combination with mechanism comprising, in combination, a bodily-movable rotatable member presenting a portion of circular shape and a surface of general involute form, a substantially horizontal support upon which said member is rollingly supported, means tending to rotate said member in one direction along said support and including a flexible element connected with said member and engaging said surface, and flexible means engaging the circular portion of said member actuated by the application of weight to the scale and in such movement winding said flexible element upon said surface, of a weight-indicating device involving a pivotally-supported element operatively controlled by said mechanism, the pivot of said pivotally-supported element being fixed.

21. In weighing mechanism, the combination of a bodily-movable rotatable member of roller form and presenting a surface of general involute form, a substantially horizontal support upon which said member is rollingly supported, means tending to rotate said member in one direction along said support and including a flexible element connected with said member and engaging said surface, flexible means engaging the circular portion of said member and actuated by the application of weight to the mechanism and in such movement winding said flexible element upon said surface, and a weight-indicating device involving a pivotally-supported element actuated by said last-named means, the pivot of said last-named element being fixed.

MORTIMER B. MILLS.